United States Patent
Kaneko

(10) Patent No.: US 9,609,192 B2
(45) Date of Patent: Mar. 28, 2017

(54) IMAGE PROCESSING APPARATUS, IMAGE PROCESSING METHOD AND PROGRAM, AND IMAGING APPARATUS

(71) Applicant: CANON KABUSHIKI KAISHA, Tokyo (JP)

(72) Inventor: Yushi Kaneko, Kawasaki-sh (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/266,169

(22) Filed: Sep. 15, 2016

(65) Prior Publication Data

US 2017/0006200 A1 Jan. 5, 2017

Related U.S. Application Data

(62) Division of application No. 14/308,183, filed on Jun. 18, 2014, now Pat. No. 9,473,684.

(30) Foreign Application Priority Data

Jun. 25, 2013 (JP) ................................ 2013-132598

(51) Int. Cl.
| | | |
|---|---|---|
| H04N 5/228 | (2006.01) | |
| H04N 5/225 | (2006.01) | |
| H04N 13/00 | (2006.01) | |
| H04N 19/597 | (2014.01) | |

(52) U.S. Cl.
CPC ........... *H04N 5/2254* (2013.01); *H04N 13/00* (2013.01); *H04N 19/597* (2014.11)

(58) Field of Classification Search
CPC ........... H04N 5/23229; H04N 5/23232; H04N 5/2228; H04N 5/2254; H04N 1/2116; H04N 1/212; H04N 1/00442

USPC ............ 348/222.1, 294, 333.01, 333.05, 340
See application file for complete search history.

(56) References Cited

U.S. PATENT DOCUMENTS

| | | | |
|---|---|---|---|
| 5,333,013 A | 7/1994 | Enari et al. .................... 348/405 |
| 5,452,007 A | 9/1995 | Enari et al. .................... 348/405 |
| 5,528,298 A | 6/1996 | Enari et al. .................... 348/405 |
| 5,825,931 A | 10/1998 | Owada ..................... 375/240.08 |
| 7,864,219 B2 * | 1/2011 | Shimauchi ........... H04N 19/107 |
| | | | 348/222.1 |
| 7,932,941 B2 | 4/2011 | Hayasaka et al. ............ 348/267 |
| 8,537,234 B2 * | 9/2013 | Litvinov ............... G06T 3/4015 |
| | | | 348/222.1 |
| 2008/0123904 A1 | 5/2008 | Sakamoto ..................... 382/107 |
| 2008/0170624 A1 * | 7/2008 | Yamada ............... H04N 21/236 |
| | | | 375/240.22 |
| 2009/0128658 A1 | 5/2009 | Hayasaka et al. ......... 348/222.1 |

(Continued)

FOREIGN PATENT DOCUMENTS

| | | |
|---|---|---|
| JP | 2009-124213 A | 6/2009 |
| JP | 2012-129654 A | 7/2012 |

*Primary Examiner* — Kelly L Jerabek
(74) *Attorney, Agent, or Firm* — Fitzpatrick, Cella, Harper & Scinto

(57) ABSTRACT

An image processing apparatus has a plurality of optical systems arranged two-dimensionally and a plurality of photoelectric conversion elements which are two-dimensionally arranged for each of the plurality of optical systems and are used to photoelectrically convert an image from each optical system, and inter-frame prediction encodes a plurality of image frames each having a different parallax, which are formed by the plurality of photoelectric conversion elements.

13 Claims, 10 Drawing Sheets

(56) References Cited

U.S. PATENT DOCUMENTS

| | | | |
|---|---|---|---|
| 2012/0154651 A1 | 6/2012 | Ohno | 348/294 |
| 2012/0194685 A1 | 8/2012 | Kawakami | 348/208.1 |
| 2013/0321581 A1 | 12/2013 | El-Ghoroury | 348/46 |
| 2014/0146201 A1 | 5/2014 | Knight | 348/231.99 |
| 2015/0201176 A1 | 7/2015 | Graziosi | 348/43 |

\* cited by examiner

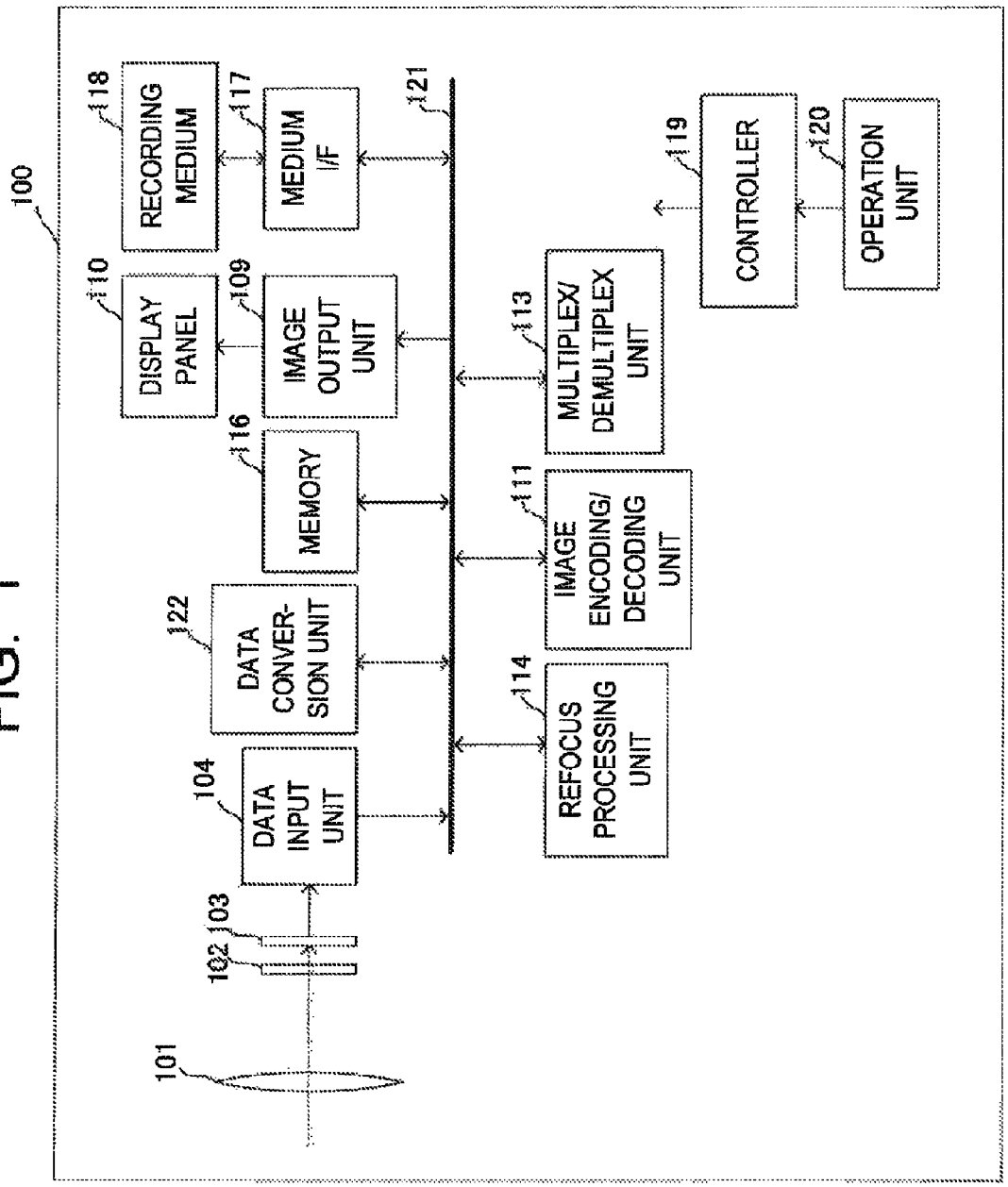

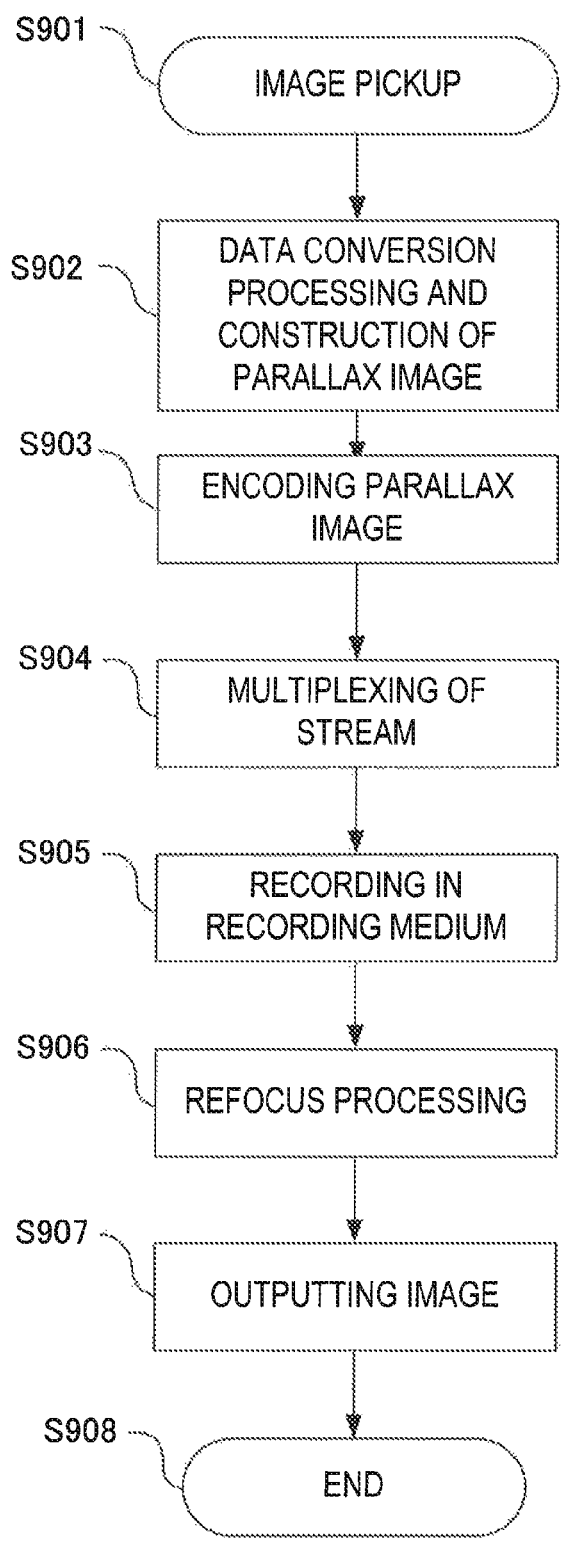

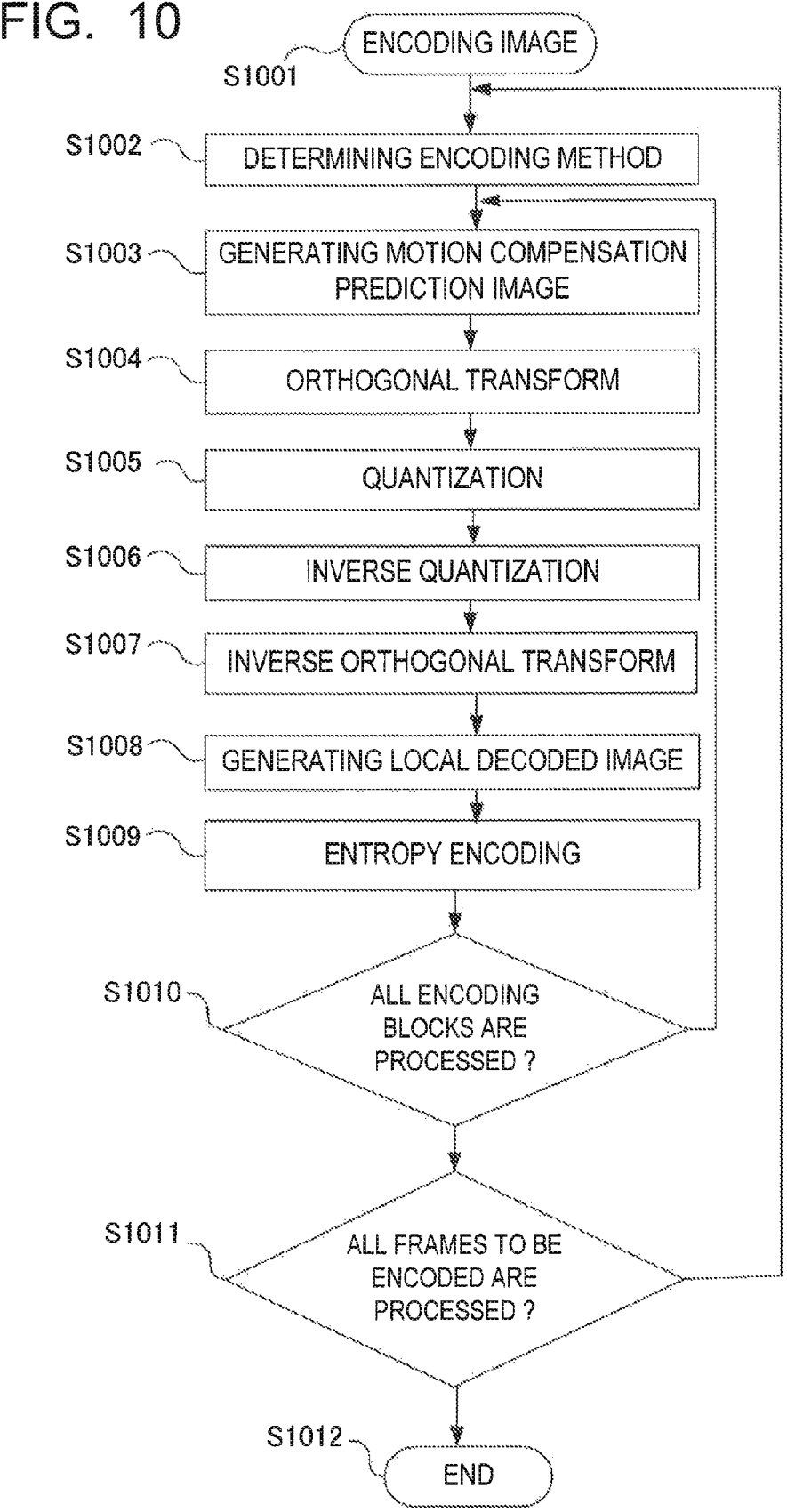

IMAGE PROCESSING APPARATUS, IMAGE PROCESSING METHOD AND PROGRAM, AND IMAGING APPARATUS

CROSS REFERENCE TO RELATED APPLICATION

This application is a division of U.S. application Ser. No. 14/308,183, filed on Jun. 18, 2014, which claims priority to Japan Patent Application No. 2013-132598, filed Jun. 25, 2013, the entire disclosure of which is hereby incorporated by reference herein in its entirety, as if fully set forth herein.

BACKGROUND OF THE INVENTION

Field of the Invention

The present invention relates to an image processing apparatus and, more particularly, to an image processing apparatus for executing an image processing of image data picked up by, for example, a light field camera. Description of the Related Art An imaging apparatus using a method called "Light Field Photography" is proposed (the Official Gazette of Japanese Patent Application Laid-Open No. 2009-124213 or the Official Gazette of Japanese Patent Application Laid-Open No. 2012-129654). The imaging apparatus is constructed in such a manner that an ML array constructed by a plurality of microlenses (hereinbelow, referred to as MLs) is used and, in addition to intensity distribution of light on a light receiving surface of an imaging element, directional information of the light can be also obtained. It is also constructed in such a manner that after the image pickup, by using the obtained intensity distribution and directional information of the light, an image can be reconstructed on the basis of a set arbitrary viewpoint and a set arbitrary focus position. In the Description, such an imaging apparatus is called "light field camera". In the light field camera, in addition to information of a position where the rays of light from an object enters an imaging plane, light ray information including information of an angle of incidence is obtained. The light ray information is called light field data (hereinbelow, referred to as LF data). An image in which the focus position of the image is changed after the image pickup can be reconstructed by using the LF data.

In the light field camera, since a ray of light corresponding to one pixel of a camera in the related art is divided by the MLs and handled as a plurality of pixel data, an amount of the data increases in proportion to the number of division. For example, assuming that the division number is equal to (5 in the vertical direction×5 in the lateral direction), the data of (5×5) pixels per ML is obtained, so that the data amount is increased by 25 times. As mentioned above, there is such a problem that the data amount of the LF data is extremely larger than an amount of data of the image picked up by an ordinary camera.

Therefore, in order to compress and store an information amount of the extremely large LF data, an importance is attached to a compression encoding technique.

The invention is made in consideration of such a point and it is an aspect of the invention to provide an encoding method suitable to compress an information amount in, for example, LF data or the like and to provide an image processing apparatus or the like for encoding, for example, LF data or the like by the proposed encoding method.

SUMMARY OF THE INVENTION

To accomplish the above aspect, according to the invention, an image processing apparatus comprises: a plurality of optical systems arranged two-dimensionally; and a plurality of photoelectric conversion elements which are two-dimensionally arranged for each of the plurality of optical systems and are used to photoelectrically convert an image from each of the optical systems, wherein a plurality of image frames each having a different parallax, which is formed by the plurality of photoelectric conversion elements are inter-frame prediction encoded.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a block diagram illustrating a construction of an imaging apparatus to which an image processing apparatus according to the first embodiment of the invention is applied.

FIG. 9 is a flowchart regarding the operation of an image pickup processing according to each embodiment of the invention.

FIG. 10 is a flowchart regarding the operation of an encoding processing according to each embodiment of the invention.

DESCRIPTION OF THE EMBODIMENTS

Figure 2A:
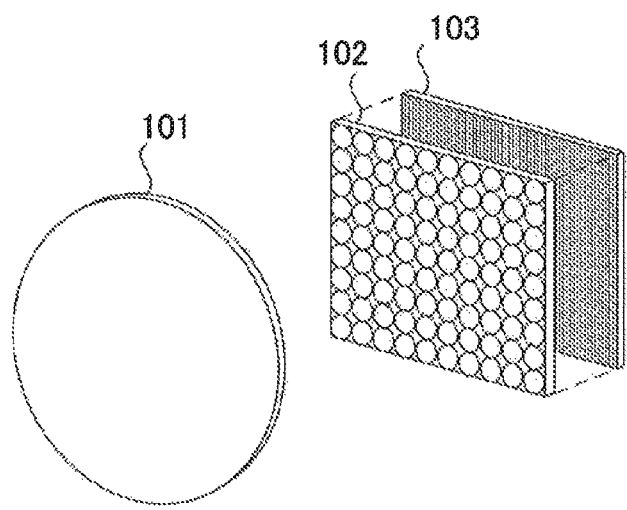
FIGS. 2A and 2B are diagrams illustrating positional relations among a main lens, MLs, and an imaging element in the imaging apparatus in FIG. 1.

Various exemplary embodiments, features, and aspects of the present invention will be described in detail below with reference to the drawings.

First Embodiment

FIG. 1 is a block diagram illustrating an example of a construction of an imaging apparatus which can pick up LF data and to which an image processing apparatus according to the first embodiment of the invention is applied.

In the diagram, a whole imaging apparatus 100 is illustrated. As component elements, the imaging apparatus 100 includes a main lens 101, a microlens (ML) 102, an imaging element 103, a data input unit 104, a data conversion unit 122, an image output unit 109, and a display panel 110. The imaging apparatus 100 further includes an image encoding/decoding unit 111, a multiplex/demultiplex unit 113, a refocus processing unit 114, a memory 116, a medium I/F 117, a recording medium 118, a controller 119, an operation unit 120, and a memory bus 121. Portions excluding the main lens 101, ML 102, imaging element 103, medium I/F 117, recording medium 118, and operation unit 120 correspond to the image processing apparatus according to the embodiment. Each component element will be described hereinbelow.

Component elements which are connected to the memory bus 121 and will be described hereinbelow transmit and receive data to/from the memory 116 and execute a data processing. The memory 116 is a dynamic RAM which can be accessed at random at a high speed. The memory 116 stores image data being processed and information necessary for the processing and provides a work area to the controller. The memory bus 121 arbitrates memory access requests from the component elements and controls so that data writing and reading operations to/from the memory 116 can be performed in a time-division manner.

The main lens 101 is an imaging optical system constructed by one or a plurality of photographing lenses. The main lens 101 receives object light from a front surface (left side in the diagram) and inputs to the ML 102. A focus function and a zoom function may be provided for the main lens 101.

The ML 102 is arranged between the main lens 101 and the imaging plane of the imaging element 103, separates the ray of light from the main lens 101 in accordance with an angle of incidence, and functions as a pupil division means. The imaging element 103 is an imaging sensor such as CCD, CMOS sensor, or the like. In the imaging element 103, a plurality of pixels (photoelectric conversion elements) are arranged in a matrix form, convert the rays of light input from the ML 102 into electric signals, and output as a picked-up image to the data input unit 104.

The data input unit 104 converts the picked-up image which is input from the imaging element 103 into digital RAW data and stores into an RAW data area in the memory 116. The data conversion unit 122 reads out the RAW data stored in the RAW data area in the memory 116, executes a development processing, and converts into LF data (401 in FIG. 4). Further, a plurality of image frames (411, 412, . . . , and 435 in FIG. 4) each having a different parallax are constructed from the LF data and stored into an image signal area in the memory 116. The operations of the main lens 101, ML 102, imaging element 103, data input unit 104, and data conversion unit 122 will be described in detail hereinafter.

The image encoding/decoding unit 111 encodes and decodes the image signal. Although the operation will be described in detail hereinafter, it will be schematically described below.

At the time of image pickup, a plurality of image frames (image data to be encoded) written in the image signal area in the memory 116 are read out and encoded by the data conversion unit 122 by using a prediction between images. Stream data obtained after the encoding is stored into an image stream data area in the memory 116. The stream data is read out from the image stream data area in the memory 116 and decoded. The decoded image frames are stored into an image signal area.

The refocus processing unit 114 reads out the image frames stored in the image signal area in the memory 116, executes a refocus processing, generates refocus image frames, and stores into the image signal area in the memory 116. The refocus processing will be described in detail hereinafter.

The multiplex/demultiplex unit 113 multiplexes and demultiplexes the image stream data. At the time of image pickup, a plurality of encoded image stream data are read out of the memory 116, are multiplexed by a predetermined format, and are stored as multiplexed data into a multiplexed stream data area in the memory 116. Upon reproduction, the multiplexed stream data is read out from the multiplexed stream data area in the memory 116, is separated into a plurality of image stream data by a predetermined method, and is stored into the image stream data area in the memory 116.

The medium I/F 117 is an interface for controlling the writing and reading (recording and reproduction) of data into/from the recording medium 118. At the time of image pickup, the multiplexed stream data stored in the multiplexed stream data area in the memory 116 is read out and stored into the recording medium 118. Upon reproduction, the multiplexed stream data is read out of the recording medium 118 and stored into the multiplexed stream data area in the memory 116. The data is recorded into the recording medium 118 by a file system format such as FAT or the like. A generation, control, and the like of a file system are also performed by the medium I/F 117.

The recording medium 118 is a hard disk drive or a nonvolatile semiconductor memory (for example, flash memory).

The image output unit 109 reads out a refocus image, which will be described hereinafter, from the area for the image signal in the memory 116 and outputs to the display panel 110 and an image output terminal (not shown). The display panel 110 displays the image signal, as a video image, which is input from the image output unit 109.

The operation unit 120 indicates operation members such as shutter button, setting button, touch panel sensor arranged on the surface of the display panel 110, and the like which are operated by the user. A result of the user's operation is transmitted as an operation instruction signal to the controller 119.

The controller 119 controls the whole imaging apparatus and includes what is called a CPU. By executing a corresponding program in response to a user's instruction which is input through the operation unit 120, the controller 119 controls the image pickup operation, reproducing operation, and refocus operation. The program is stored in a memory (not shown). The CPU loads and executes the program, thereby controlling each unit of the imaging apparatus.

Subsequently, the operations of the main lens 101, ML 102, imaging element 103, data input unit 104, data conversion unit 122, and image encoding/decoding unit 111 will be described in detail.

Figure 2B:
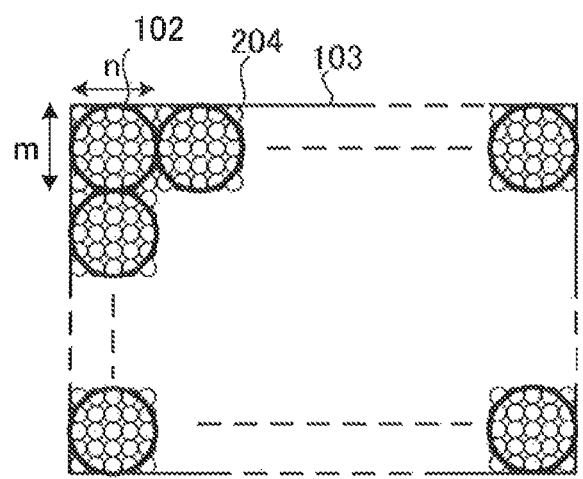

FIGS. 2A and 2B are diagrams illustrating positional relations among the main lens 101, MLs 102, and imaging element 103 in the imaging apparatus illustrated in FIG. 1. The same portions as those in FIG. 1 are designated by the same reference numerals and their description is omitted here.

In the diagrams, pixels 204 construct a two-dimensional pixel array of the imaging element 103.

As illustrated in FIG. 2A, a plurality of MLs 102 are arranged on the front surface of the imaging element 103 in a matrix form (two-dimension) (ML array). A size of ML and the number of MLs in the embodiment are not limited to those illustrated in the diagrams.

As illustrated in FIG. 2B, the pixels 204 are arranged in a matrix form (two-dimension) in such a manner that a predetermined number (n×m) of pixels correspond to one ML. The number of division of the rays of light is determined by the number (n×m) of pixels. In the present embodiment, it is assumed that the division number of the rays of light is equal to (5×5). The imaging element 103 has a two-dimensional pixel array in which (5×5) pixels are arranged to one ML.

Figure 3:
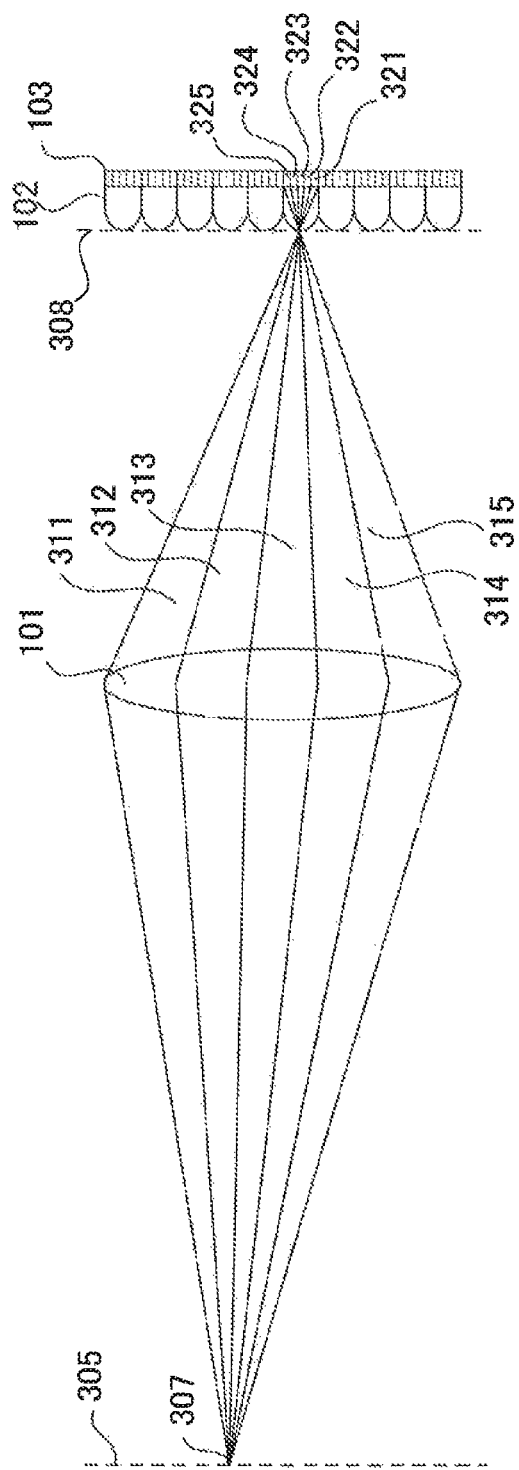
FIG. 3 is a diagram conceptually illustrating optical paths of rays of light from an object in the positional relations in FIGS. 2A and 2B.

FIG. 3 conceptually illustrates optical paths of the rays of light from an object in the positional relations illustrated in FIGS. 2A and 2B. That is, FIG. 3 illustrates the optical paths at the time when light 307 emitted from one point of an object 305 enters the main lens 101 as rays of light. The entered rays of light are converged by the main lens 101 and enter an imaging plane 308 of the surface of the ML 102. The entered light is separated in accordance with the angle of incidence of the light by the ML 102 and received by pixels 321 to 325 of the imaging element 103. The light received by the pixels 321 to 325 is output as image pickup signals through a photoelectric conversion.

The light received by the pixel 321 is the ray of light from an optical path 311. The light received by the pixel 322 is the ray of light from an optical path 312. The light received by the pixel 323 is the ray of light from an optical path 313. The light received by the pixel 324 is the ray of light from an optical path 314. The light received by the pixel 325 is the ray of light from an optical path 315. Although the rays of light received by the pixels 321 to 325 are the light from the same object, they are the light rays which pass through different pupil areas of the main lens plane and can be regarded as rays of light each having a different parallax.

Although an example in which the light 307 from one point of the object 305 is picked up by the pixels has been described with reference to FIG. 3, actually, an infinite number of rays of light enter the main lens from all objects of the front surface of the main lens in such a manner that the object image is focused onto the whole MLs. Each ML separates the incident light and emits to the (n×m) pixels of the imaging element 103. Thus, a plurality of images each having a different parallax (hereinbelow, referred to as parallax images) are focused on each of the (n×m) pixels corresponding to each ML in the imaging element.

The data input unit 104 converts the picked-up image which is picked up as mentioned above into the digital RAW data and stores into the RAW data area in the memory 116. The data conversion unit 122 reads out the RAW data stored in the RAW data area in the memory 116, executes the development processing, and converts into the LF data. Since the parallax image is picked up at each of the (n×m) pixels corresponding to each ML for the LF data, the parallax image can be obtained by constructing an image by collecting the pixel data of the same position to each ML. Therefore, the data conversion unit 122 constructs a plurality (n×m) of image frames each having a different parallax from the LF data as follows.

Figure 4:
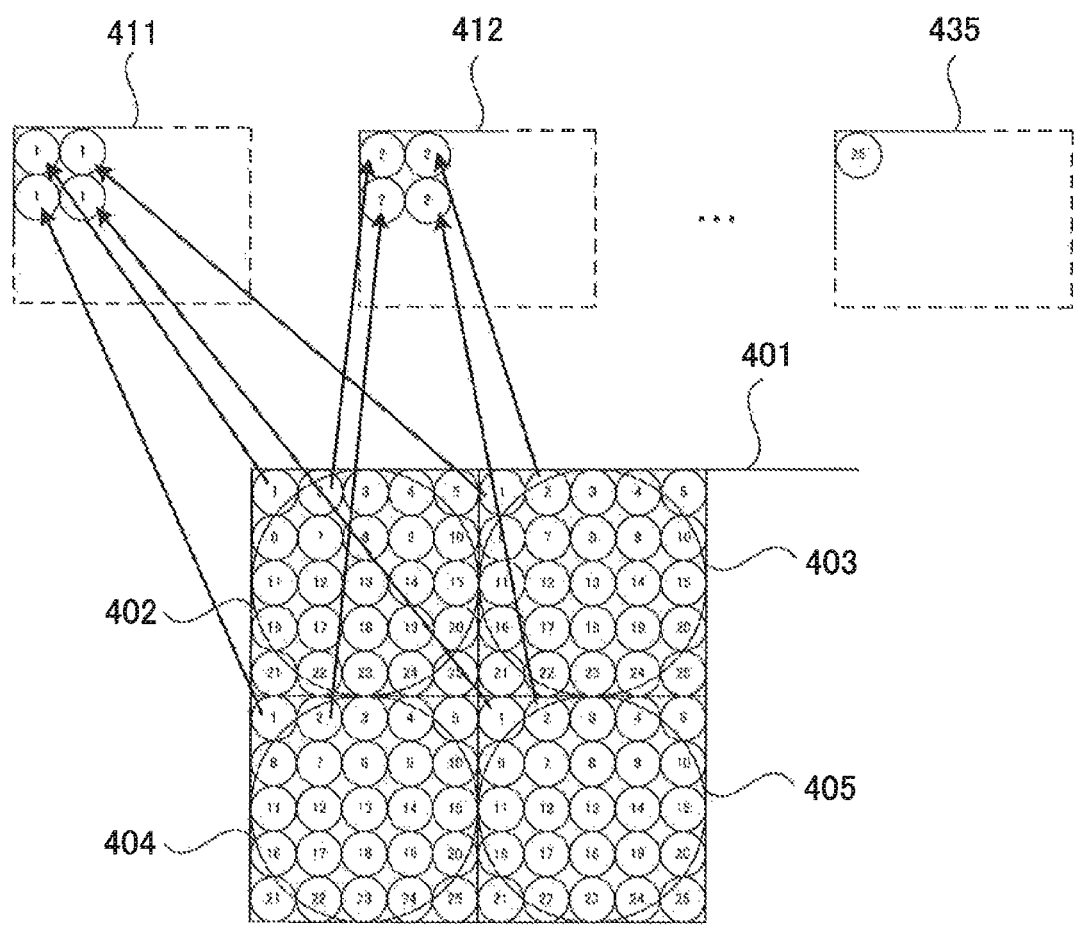
FIG. 4 is a diagram illustrating a relation between LF data and image frames.

FIG. 4 is a diagram illustrating a relation between the LF data and pixel data of the image frames at the time of generating the image frames. In the diagram, the same portions as those in FIG. 1 are designated by the same reference numerals and their description is omitted here.

In FIG. 4, positions 402 to 405 of the MLs are shown, circles shown by 1 to 25 are the LF data corresponding to one ML, and the image frames 411, 412, . . . , and 435 each having a different parallax are illustrated.

The image frame 411 is constructed by collecting the LF data 1 at the end of the left-hand side of the first row among the LF data 1 to 25 corresponding to each ML. Although only the LF data (only four pixels) corresponding to the four MLs are illustrated in FIG. 4, actually, the LF data at the end of the left-hand side of the first row corresponding to each of all the MLs in the LF data 401 is target data of collection.

The image frame 412 is constructed by collecting the second LF data 2 from the end of the left-hand side of the first row among the LF data 1 to 25 corresponding to each ML. Although only the LF data (only four pixels) corresponding to the four MLs are illustrated in FIG. 4 in a manner similar to the image frame 411, actually, the second LF data from the end of the left-hand side of the first row corresponding to each of all the MLs in the LF data 401 is target data of collection.

Similarly, by collecting the LF data 3 to 25 of each ML, the corresponding image frames 413 to 435 (the image frames 413 to 434 are not shown) are constructed, and total 25 image frames 1 to 25 are constructed from the LF data obtained through the image pickup of one time.

There is a case where an enough light amount is not obtained in the pixels locating near four corners for the ML. This is because since the main lens 101 and the ML 102 are circular, a vignetting occurs. In such a case, for example, it is also possible to construct in such a manner that the image frames obtained by collecting the LF data 1, 5, 21, and 25 locating at the four corners are not constructed. In this case, in the encoding processing, decoding processing, and refocus processing, which will be described later, the non-constructed image frames 1, 5, 21, and 25 are not used.

The data conversion unit 122 stores the image frames 1 to 25 constructed as mentioned above into the image signal area in the memory 116.

The image frames 1 to 25 stored in the image signal area in the memory 116 are encoded by the image encoding/decoding unit 111.

Subsequently, the encoding operation in the image encoding/decoding unit 111 will be described in detail.

In the present embodiment, it is assumed that the image encoding/decoding unit 111 uses a motion compensation prediction encoding method represented by MPEG2, H.264, or the like. As an encoding method, there are an intra-frame encoding in which the encoding is completed in the same image frame and an inter-frame prediction encoding in which the prediction is performed among a plurality of image frames.

In the motion compensation prediction encoding method, the image is separated into predetermined encoding blocks (macro blocks of 16×16 pixels), a motion compensation prediction and an orthogonal transform are performed, further, conversion coefficients are quantization-processed, and an entropy encoding is performed, thereby compression-encoding the image.

Since each of the image frames 1 to 25 (collectively referred to as an image frame group) is a parallax image and the image frames mutually have a high correlation, by executing the inter-frame prediction encoding, a high encoding efficiency can be expected.

In the present embodiment, the intra-frame encoding is performed to partial image frames in the image frame group and the inter-frame prediction encoding is performed to the other image frames. Generally, the inter-frame prediction indicates the prediction between the frames in the time direction in the motion image. However, in the present embodiment, the inter-frame prediction indicates the prediction between the image frames (411 to 435) each having a different parallax obtained from the LF data at the same time.

Figure 5:
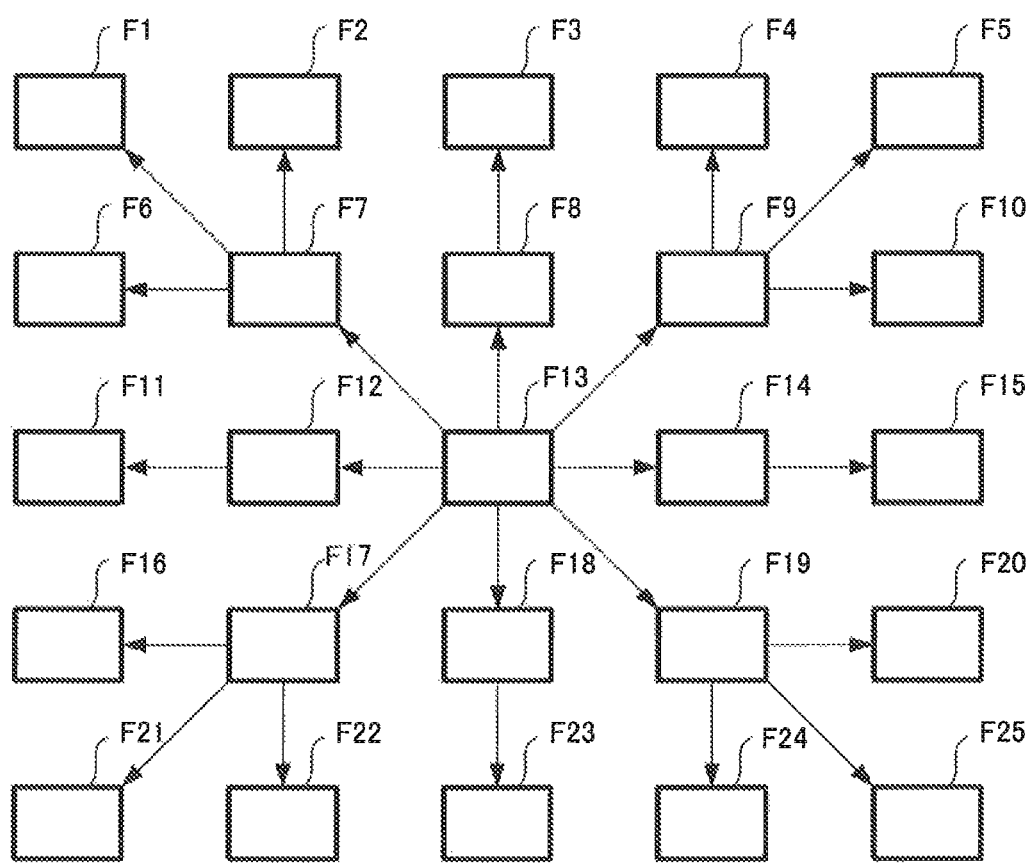
FIG. 5 is a diagram illustrating an example of reference relations among image frames in an inter-frame prediction in the parallax direction according to the first embodiment of the invention.

An example of the inter-frame predicting direction in the image frame group is illustrated in FIG. 5. In this figure, F1 to F25 denote image frames 1 to 25 respectively. An arrow shown between the image frames indicates the direction of the inter-frame prediction. A reference image is determined on the basis of the parallax direction.

In the example illustrated in FIG. 5, the intra-frame encoding is performed to an image frame F13 locating in the center portion of the parallax among image frames F1 to F25.

The inter-frame prediction encoding using F13 as a reference image is performed to F7, F8, F9, F12, F14, F17, F18, and F19 adjacent to F13.

The inter-frame prediction encoding using the image frame F8 as a reference image is performed to F3 adjacent to F8.

The inter-frame prediction encoding using the image frame F12 as a reference image is performed to F11 adjacent to F12.

The inter-frame prediction encoding using the image frame F14 as a reference image is performed to F15 adjacent to F14.

The inter-frame prediction encoding using the image frame F18 as a reference image is performed to F23 adjacent to F18.

The inter-frame prediction encoding using the image frame F7 as a reference image is performed to F1, F2, and F6 adjacent to F7.

The inter-frame prediction encoding using the image frame F9 as a reference image is performed to F4, F5, and F10 adjacent to F9.

The inter-frame prediction encoding using the image frame F17 as a reference image is performed to F16, F21, and F22 adjacent to F17.

Further, the inter-frame prediction encoding using the image frame F19 as a reference image is performed to F20, F24, and F25 adjacent to F19.

The inter-frame predicting direction based on the parallax direction is not limited to that shown in the diagram but may be another direction. A bidirectional prediction from a plurality of reference images may be performed as for the inter-frame prediction. Further, the image frames to be intra-frame encoded are not limited to one image frame but the apparatus may be set so as to perform the intra-frame encoding to a plurality of image frames at predetermined positions. In such a case, the inter-frame prediction of different series may be performed to the image frames in predetermined directions from each image frame to be intra-frame encoded.

Subsequently, the operations of the intra-frame encoding and the inter-frame prediction encoding in the image encoding/decoding unit 111 will be described.

In the present embodiment, the image frames 1 to 25 are encoded by the method of either the intra-frame encoding or the inter-frame prediction encoding. As encoding order of the image frames, the image frames to be intra-frame encoded are encoded first and, after that, the image frames to be inter-frame encoded are encoded. For example, in the present embodiment, the encoding is performed in the following order.

F13
→F8→F3
→F12→F11
→F14→F15
→F18→F23
→F7→F6→F1→F2
→F9→F4→F5→F10
→F17→F16→F21→F22
→F19→F20→F24→F25

In the intra-frame encoding, the image frame (for example, F13) to be encoded is read out from the image signal area in the memory 116 and an orthogonal transform, a quantization of the conversion coefficients, and an entropy encoding are sequentially performed on an encoding block (for example, 16×16 pixels) unit basis, thereby obtaining stream data. Information such as quantization parameters which is necessary to decode is contained in the stream data. The stream data is stored in the image stream data area in the memory 116. At the same time, an inverse quantization of the quantized conversion coefficients and an inverse orthogonal transform are performed, thereby obtaining a local decoding image. The local decoding image is stored in the reference frame area in the memory 116.

In the inter-frame prediction encoding, the image frame (for example, F7) to be encoded is read out from the image signal area in the memory 116 and an image (local decoding image) obtained by encoding and decoding the image frame (for example, F13) serving as a reference destination is read out. A motion search is performed every encoding block to detect a motion vector, and a prediction image is generated. Subsequently, a difference (error) between the prediction image and the image data to be encoded is obtained. To such a difference, the orthogonal transform, the quantization of the conversion coefficients, and the entropy encoding are sequentially performed on an encoding block unit basis, thereby obtaining stream data. The stream data includes information such as quantization parameters which is necessary to decode, reference image frame number, motion vector, and the like. The stream data is stored in the image stream data area in the memory 116. At the same time, the quantized conversion coefficients are inversely quantized, are inversely orthogonal-transformed, and are added to the prediction image, thereby obtaining the local decoding image. The local decoding image is stored in the reference frame area in the memory 116.

A plurality of stream data in which the image frames 1 to 25 are encoded as mentioned above are multiplexed by the multiplex/demultiplex unit 113 in encoding order. As header information, information such as the number of image streams, parallax positional relation, and the like is also simultaneously multiplexed to the multiplexed stream. The multiplexed stream data is temporarily stored into the multiplexed stream area in the memory 116 and, thereafter, is read out by the medium I/F 117, and is recorded into the recording medium 118.

Subsequently, the operation of the image encoding/decoding unit 111 upon reproduction will be described in detail.

The multiplexed stream recorded in the recording medium 118 is read out by the medium I/F 117 and is stored into the multiplexed stream area in the memory 116. The multiplex/demultiplex unit 113 reads out the multiplexed stream from the multiplexed stream area in the memory 116 and stores the image streams into the image stream area in the memory 116 in accordance with the information such as the number of image streams, parallax positional relation, and the like included in the header information of the multiplexed stream.

The image encoding/decoding unit 111 reads out the image streams from the image stream area in the memory 116 and entropy-decodes them to obtain the quantization coefficients, and thereafter, performs the inverse quantization and inverse orthogonal transform to obtain the decoded image frames. In the case of the intra-frame encoding, the decoded image frames are stored as they are into the image signal area in the memory 116. In the case of the inter-frame prediction encoding, the image frame of the reference destination is read out, the motion compensation processing is executed, and the obtained image frame is stored in the image signal area in the memory 116.

By performing the decoding as mentioned above, the decoded images of the image frames 1 to 25 are stored in the image signal area in the memory 116.

Subsequently, the generating operation of a refocus image in the image processing apparatus of the embodiment will be described.

In the image processing apparatus of the present embodiment, the refocus image can be generated in both of the case of image pickup and the case of reproduction. In any case, the refocus image is generated from the image frames 1 to 25 stored in the image signal area in the memory 116 by the refocus processing unit 114. At the time of image pickup, as for the image frames 1 to 25 stored in the image signal area in the memory 116, the refocus image is generated from the image frames which are constructed by the data conversion unit 122 and are stored in the memory 116. At the time of reproduction, the refocus image is generated from the image frames which are decoded by the image encoding/decoding unit 111 and are stored in the memory 116.

The refocus image is generated by one of the following two methods.

Figure 6:
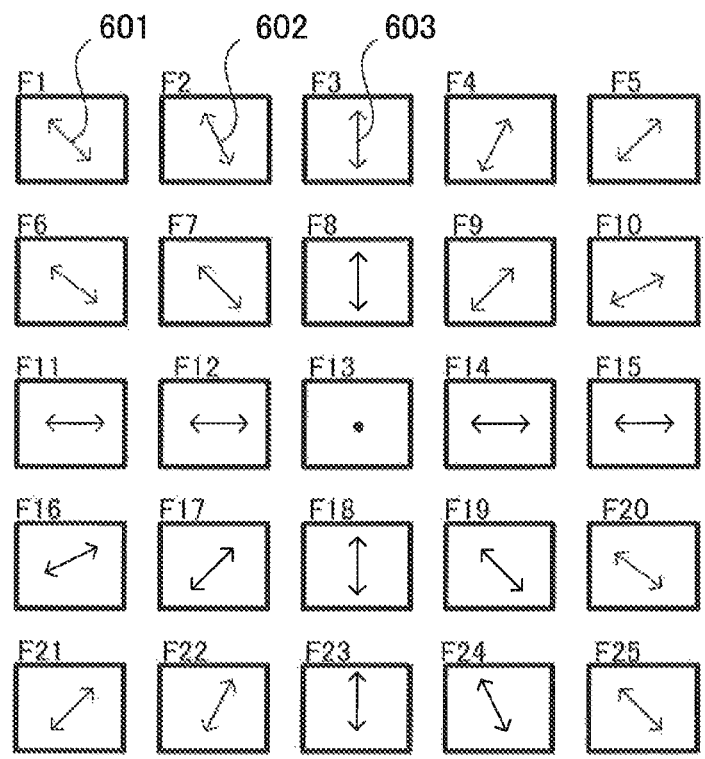
FIG. 6 is a diagram illustrating a direction in which a pixel of each image frame is shifted in a refocus processing in the image processing apparatus according to the first embodiment of the invention.

According to the first refocus method, a position in a depth of focus (position of a focal point) is designated and the refocus is performed. Each of the pixel data of the image frames 1 to 25 is shifted in the parallax direction to be integrated, thereby generating the refocus image. The parallax direction is a direction which is determined by the positional relations of the image frames to the center image frame. As illustrated in FIG. 6, for example, in the case of the image frame F1, the parallax direction is a direction shown by 601, in the case of the image frame F2, it is a direction 602, and in the case of the image frame F3, it is a direction 603. The refocus position can be changed in dependence on a shift amount of the pixel data.

According to the second refocus method, the user designates an area (object) of the image to be focused to generate the refocus image. Each of the pixel data of the image frames 1 to 25 is shifted on the basis of the motion vector information detected in the encoding of the image frames and integrated, thereby generating the refocus image. When the user designates an area of the image to be focused through the operation unit 120, the refocus processing unit 114 obtains motion vector information of the encoding blocks around such an area from the image streams of the image frames 1 to 25. A motion vector from the center image frame in each image frame is calculated, respectively. By shifting the pixel data of each image frame in accordance with the motion vector and integrating, the refocus image is generated.

The refocused images obtained as mentioned above are stored into the image signal area in the memory 116. The stored refocus images are output to the display panel 110 and an image output terminal (not shown) by the image output unit 109 mentioned above. It is also possible to construct in such a manner that the controller 119 controls each unit of the imaging apparatus 100, encodes the refocus image, and controls the medium I/F 117 to record the encoded refocus image to the recording medium 118.

As described above, according to the present embodiment, since a plurality of image frames as parallax images are constructed from the LF data and the prediction encoding in the parallax direction is performed, a compression encoding of a high compression ratio can be realized and the data amount can be reduced.

The operation of each unit of the image processing apparatus of the present embodiment mentioned above may be executed by a method whereby a CPU of the controller 119 loads a program from a memory (not shown) and executes. In such a case, as an electronic processing, the image processing apparatus of the embodiment can be provided as a function which is executed by a CPU of an information processing apparatus such as a PC or the like.

FIGS. 9 and 10 illustrate flowcharts for the image processing operation at the time when the CPU of the controller 119 functions as each unit of the image processing apparatus of the present embodiment. The flowcharts of FIGS. 9 and 10 are diagrams illustrating a processing procedure which is executed by the controller 119 and are realized by a method whereby the program stored in the memory (ROM) held in the controller 119 is developed into the memory (RAM) and the CPU executes it.

First, the operation at the time of image pickup will be described with reference to the flowchart of FIG. 9. The main lens 101, ML 102, imaging element 103, and data input unit 104 among the foregoing component elements operate in a manner similar to that mentioned above. The picked-up image signal is stored as unprocessed RAW data into the RAW data area in the memory 116. The subsequent image processing is executed by the CPU of the controller 119.

FIG. 9 is the flowchart showing the processing procedure at the time of image pickup which is executed by the CPU of the controller 119. In step S901, the image pickup operation is started. Steps S902 to S907 are executed as an image processing of the image data obtained by the image pickup operation of one time.

In step S902, a data conversion processing is executed. This step is a processing corresponding to the foregoing data conversion unit 122. The RAW data is read out from the RAW data area in the memory 116, a development processing is executed, and the RAW data is converted into LF data. A plurality of (n×m) image frames (image frame group) each having a different parallax are constructed from the LF data in a manner similar to that mentioned above and are stored into the image signal area in the memory 116.

Subsequently, in step S903, the constructed image frame group is encoded. This step is a processing corresponding to the foregoing encoding processing in the image encoding/decoding unit 111. The image frame group is encoded by a motion compensation prediction method. The encoded stream data is stored into the stream data area in the memory 116. A flow for the encoding processing will be described in detail hereinafter.

Subsequently, in step S904, a multiplex processing of the plurality of encoded stream data is executed. This step is a processing corresponding to the multiplex processing of the foregoing multiplex/demultiplex unit 113. The plurality of stream data are read out from the stream data area in the memory 116 and multiplexed. As header information, information such as the number of image streams, parallax positional relation, and the like is also simultaneously multiplexed to the multiplexed stream. The obtained multiplexed stream data is stored into the multiplexed stream data area in the memory 116.

Subsequently, in step S905, the multiplexed stream data is recorded to the recording medium. The multiplexed stream data stored in the multiplexed stream data area in the memory 116 is read out and recorded to the recording medium 118 through the medium I/F 117.

Subsequently, in step S906, the refocus processing is executed. This step corresponds to the foregoing refocus processing unit 114. The refocus image is generated from the image frame group and stored into the image signal area in the memory 116.

Subsequently, in step S907, the generated refocus image is output as a monitor image. Control is made in such a manner that the refocus image stored in the image signal area in the memory 116 is output to the display panel 110 and the image output terminal (not shown) through the image output unit 109.

As mentioned above, the processing procedure of the CPU of the controller 119 in the image pickup operation in the first embodiment is executed.

Subsequently, a detailed procedure for the encoding processing in step S903 will be described with reference to the flowchart of FIG. 10.

FIG. 10 is the flowchart showing the detailed procedure for the encoding processing (step S903) of the CPU of the controller 119 in the image pickup operation in the first embodiment.

In step S1001, the encoding processing is started. In step S1002, parameters regarding the encoding of the image frame to be encoded are determined. As parameters regarding the encoding, there are a frame number of the image frame to be encoded, a prediction method (either the intra-frame or the inter-frame), a frame number of the reference image frame, and the like.

The following processings of steps S1003 to S1009 are repetitively executed on the encoding block unit basis until the processing of one image frame is completed.

Step S1003 is executed only at the time of the inter-frame encoding and a prediction image at the time of the inter-frame encoding is generated. The image frame to be encoded is read out from the image signal area in the memory 116 and the local decoding image of the image frame serving as a reference destination is also read out. A motion search is performed to detect a motion vector, and a prediction image is generated.

Subsequently, in step S1004, an orthogonal transform is performed. At the time of the intra-frame encoding, the image frame to be encoded is read out from the image signal area in the memory 116 and is orthogonal-transformed. At the time of the inter-frame encoding, the orthogonal transform is performed to a difference between the prediction image and the image data to be encoded.

Subsequently, in step S1005, a quantization is performed to the orthogonal-transformed conversion coefficients.

Subsequently, in step S1006, an inverse quantization is performed to the quantized conversion coefficients.

Subsequently, in step S1007, an inverse orthogonal transform is performed to the inverse-quantized conversion coefficients.

Subsequently, in step S1008, a local decoding image is generated. At the time of the intra-frame encoding, the data obtained by the inverse orthogonal transform is set to local decoding image data. At the time of the inter-frame encoding, the data obtained by the inverse orthogonal transform and the prediction image generated in step S1003 are added, thereby forming a local decoding image. The obtained local decoding image is stored into the reference frame area in the memory 116.

Subsequently, in step S1009, an entropy encoding is performed to the quantized conversion coefficients obtained in step S1005 and the motion vector obtained in step S923, thereby obtaining stream data.

In step S1010, whether or not all of the processings of the encoding block unit in steps S1003 to S1009 mentioned above are completed with respect to one image frame is discriminated. If they are not completed yet, the processing routine is returned to S1003. If they are completed, S1011 follows.

In step S1011, whether or not the encoding processing to all of the image frame groups is completed is discriminated. If it is not completed yet, the processing routine is returned to S1002. If it is completed, S1003 follows and the encoding processing is finished.

Second Embodiment

Subsequently, the second embodiment of the invention will be described. Although the first embodiment is described with respect to the example of the prediction encoding in the parallax direction of the LF data obtained by the image pickup operation of one time of the imaging apparatus, the second embodiment will be described with respect to a construction in which a plurality of continuous LF data obtained by the image pickup of a moving image are encoded. An example of the construction of the imaging apparatus in the second embodiment is similar to that in the first embodiment and a description of component elements is omitted here.

The second embodiment differs from the first embodiment with respect to a point that the prediction encoding in the parallax direction is performed by the image encoding/decoding unit 111 in each image frame group obtained from the same LF data and, at the same time, the inter-frame prediction encoding in the time direction is also performed between the image frame groups which are temporally neighboring. Other component elements are similar to those in the first embodiment and a description of them is omitted here. Flowcharts for the image processing operation at the time when the CPU of the controller 119 functions as each unit of the image processing apparatus of the embodiment are also similar to those in FIGS. 9 and 10. As will be described hereinlater, the encoding processing has contents according to such a result that the number of predicting directions in the prediction encoding is increased as compared with that in the first embodiment.

At the time of image pickup, the image encoding/decoding unit 111 operates so as to execute the inter-frame prediction encoding in the time direction in addition to the inter-frame prediction encoding in the parallax direction shown in the first embodiment.

Figure 7:
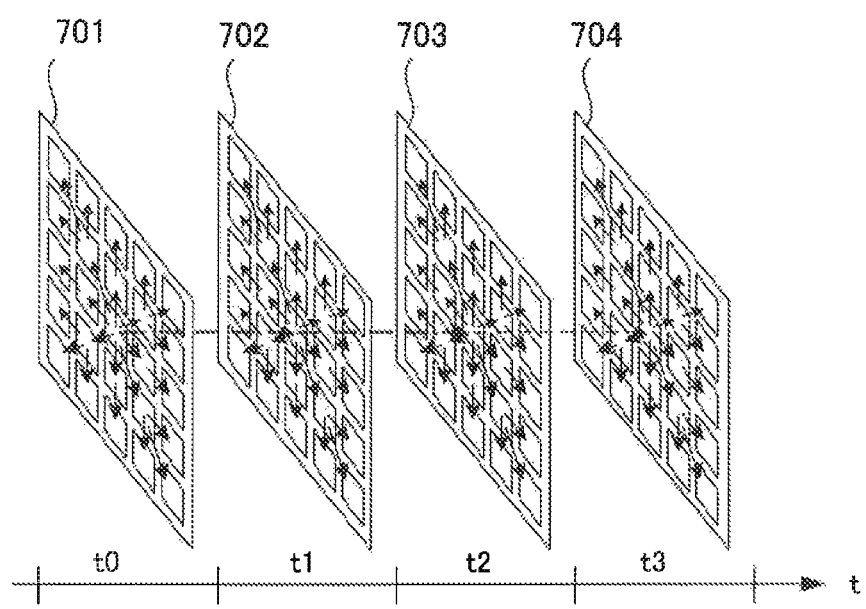
FIG. 7 is a diagram illustrating an example of reference relations among image frames in an inter-frame prediction in the time direction according to the second embodiment of the invention.

One example of the predicting directions in the inter-frame prediction in the parallax direction and the time direction is illustrated in FIG. 7. FIG. 7 illustrates each image frame group of data of moving images picked up at time t0 to t3. An image frame group 701 is constructed by the image frames 1 to 25 at time t0. This is true of image frame groups 702 to 704 and they are constructed by the image frames 1 to 25 at time t1, t2, and t3, respectively.

In the image frame group 701, the intra-frame encoding is performed to the image frame 13 locating at the center and the inter-frame prediction encoding in the parallax direction is performed to the other image frames.

In the image frame group 702, the inter-frame prediction encoding is performed in the time direction to the image frame 13 locating at the center by the image frames at the same position of t0 in place of the intra-frame encoding and the inter-frame prediction encoding in the parallax direction is performed to the other image frames.

The encoding processings are also executed to the image frame groups 703 and 704 in a manner similar to the image frame group 702.

Figure 8:
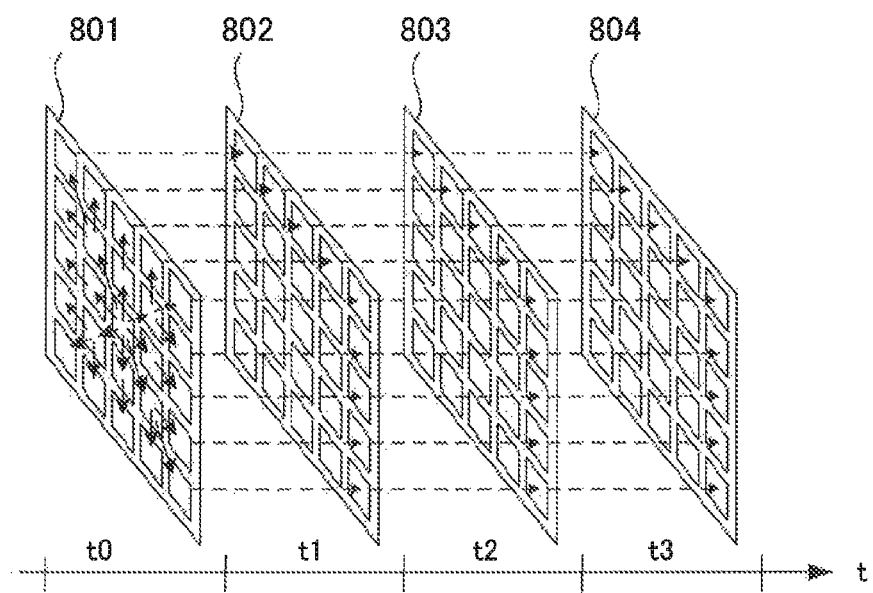
FIG. 8 is a diagram illustrating another example of reference relations among image frames in an inter-frame prediction in the time direction according to the second embodiment of the invention.

The inter-frame predicting directions of the parallax direction and the time direction in the embodiment are not limited to those illustrated in FIG. 7. As illustrated in FIG. 8, the inter-frame prediction in the time direction may be applied to all of the image frames after t1. A bidirectional prediction in which the inter-frame prediction in the parallax direction and the inter-frame prediction in the time direction are combined may be performed from a plurality of reference images. It is desirable to construct the apparatus in such a manner that the inter-frame prediction in the time direction shown in FIG. 7 or FIG. 8 is reset after it is continued the specific number of times, and the encoding is performed again from the intra-frame encoding. By this method, an error propagation different from the actual one can be eliminated on the way of the processing. According to the foregoing embodiment, even in the encoding of the moving image in which each frame contains a plurality of parallax images, a code amount of the encoded data can be reduced by the prediction encoding to the parallax image.

Other Embodiments

Embodiments of the present invention can also be realized by a computer of a system or apparatus that reads out and executes computer-executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer-executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-132598, filed Jun. 25, 2013, which is hereby incorporated by reference herein in its entirety.

What is claimed is:

1. An image processing apparatus comprising:
a plurality of optical systems arranged two-dimensionally;
a plurality of photoelectric conversion elements which are two-dimensionally arranged for each of the plurality of optical systems and are used to photoelectrically convert an image from each of the optical systems; and
at least one processor that functions as:
a storing unit configured to store a plurality of image frames each having a different parallax, which are formed by the plurality of photoelectric conversion elements;
an encoding unit configured to inter frame prediction encode the plurality of image frames by a prediction encoding based on a prediction in a time direction; and
a multiplex unit configured to generate stream data by multiplexing encoded data generated by the encoding unit.

2. The image processing apparatus according to claim 1, wherein the encoding unit encodes a predetermined image frame among the plurality of image frames by an intra-frame encoding and encodes the other image frames by an inter-frame prediction encoding, and in the inter-frame prediction encoding, a reference image is determined in accordance with a parallax direction and a motion vector is detected.

3. The image processing apparatus according to claim 1, wherein image data to be encoded is moving image data constructed by a plurality of frames, the plurality of photoelectric conversion elements convert image data of each frame of the moving image data into the plurality of image frames, and the encoding unit encodes the plurality of image frames of each frame of the moving image data by a prediction encoding based on a prediction in a parallax direction and a prediction in a time direction.

4. The image processing apparatus according to claim 3, wherein the encoding unit performs the prediction encoding based on the prediction in the time direction to a predetermined image frame of each frame of the moving image data.

5. The image processing apparatus according to claim 3, wherein the encoding unit performs the prediction encoding based on the prediction in the time direction to all of the image frames of each frame of the moving image data.

6. The image processing apparatus according to claim 1, further comprising a refocus image generation unit configured to generate a refocus image from the plurality of image frames generated by the plurality of photoelectric conversion elements on the basis of an instruction of a user, wherein the at least one processor functions as the refocus image generation unit.

7. The image processing apparatus according to claim 6, wherein the refocus image generation unit generates the refocus image by shifting a pixel of each image frame in a direction of the parallax and integrating the shifted pixel.

8. The image processing apparatus according to claim 7, further comprising a decoding unit configured to decode encoded data generated by the encoding unit and generate a plurality of decoded image frames,
wherein the refocus image generation unit generates the refocus image from the plurality of decoded image frames generated by the decoding unit, wherein the at least one processor functions as the decoding unit.

9. The image processing apparatus according to claim 8, wherein the refocus image generation unit generates the refocus image by shifting a pixel of each decoded image frame on the basis of information of a motion vector detected in the prediction in the parallax direction by the encoding unit and integrating the shifted pixel.

10. The image processing apparatus according to claim 1, wherein the plurality of image frames are formed by combining a signal from at least one of the plurality of photoelectric conversion elements corresponding to one of the plurality of optical systems and a signal from at least one of the plurality of photoelectric conversion elements corresponding to the other optical systems.

11. The image processing apparatus according to claim 1, further comprising a recording unit configured to record the stream data generated by the multiplex unit in a recording medium, wherein the at least one processor functions as the recording unit.

12. An image processing method using an image processing apparatus having a plurality of optical systems arranged two-dimensionally and a plurality of photoelectric conversion elements which are two-dimensionally arranged for each of the plurality of optical systems and are used to photoelectrically convert an image from each of the optical systems, comprising:
  storing a plurality of image frames each having a different parallax, which are formed by the plurality of photoelectric conversion elements;
  inter frame prediction encoding the plurality of image frames by a prediction encoding based on a prediction in a time direction; and
  generating stream data by multiplexing encoded data generated in the inter-frame prediction encoding.

13. A non-transitory computer-readable storage medium storing a program for causing a computer to control an image processing apparatus having a plurality of optical systems arranged two-dimensionally and a plurality of photoelectric conversion elements which are two-dimensionally arranged for each of the plurality of optical systems and are used to photoelectrically convert an image from each of the optical systems,
  wherein the program causes the computer to function as a storing unit configured to store a plurality of image frames each having a different parallax, which are formed by the plurality of photoelectric conversion elements; an encoding unit configured to inter frame prediction encode the plurality of image frames by a prediction encoding based on a prediction in a time direction; and a multiplex unit configured to generate stream data by multiplexing encoded data generated by the encoding unit.

\* \* \* \* \*